(12) United States Patent
Bernhardt

(10) Patent No.: US 8,173,191 B2
(45) Date of Patent: May 8, 2012

(54) KNOTTING SYSTEM FOR A DOUGH STRAND

(75) Inventor: Udo Bernhardt, Iphofen (DE)

(73) Assignee: Fritsch GmbH, Markt Einersheim ( * ) Notice: Subject to any disclaimer, the term of this patent is extended or adjusted under 35 U.S.C. 154(b) by 89 days.

(21) Appl. No.: 12/784,547

(22) Filed: May 21, 2010

(65) Prior Publication Data

US 2010/0233340 A1     Sep. 16, 2010

Related U.S. Application Data

(62) Division of application No. 10/585,521, filed as application No. PCT/EP2005/050078 on Jan. 10, 2005, now abandoned.

(30) Foreign Application Priority Data

Jan. 12, 2004  (DE) .......................... 10 2004 001 792

(51) Int. Cl.
 *A21C 3/06* (2006.01)
(52) U.S. Cl. ........ 426/499; 426/512; 426/517; 425/145; 425/150; 425/323; 425/334; 425/391
(58) Field of Classification Search .................. 426/499, 426/500, 512, 517, 143; 425/145, 150, 323, 425/334, 391
See application file for complete search history.

(56) References Cited

U.S. PATENT DOCUMENTS

| | | | |
|---|---|---|---|
| 5,492,708 A * | 2/1996 | Hemmerich | 426/499 |
| 5,580,599 A * | 12/1996 | Fehr | 426/499 |
| 5,702,732 A * | 12/1997 | Piller | 425/145 |
| 6,276,919 B1 * | 8/2001 | Jensen et al. | 425/323 |

FOREIGN PATENT DOCUMENTS

| | | |
|---|---|---|
| DE | 1 782 289 | 8/1971 |
| DE | 44 30 172 A1 | 2/1996 |
| DE | 197 21 062 A1 | 11/1997 |
| DE | 196 49 839 A1 | 6/1998 |
| DE | 200 07 872 U1 | 9/2000 |
| DE | 10029171 A1 * | 8/2001 |
| DE | 203 09 072 U1 | 9/2003 |
| EP | 0 499 964 A1 | 8/1992 |
| EP | 0 938 844 A1 | 9/1999 |
| EP | 1 255 441 B1 | 8/2001 |

* cited by examiner

*Primary Examiner* — Richard Crispino
*Assistant Examiner* — Thukhanh Nguyen
(74) *Attorney, Agent, or Firm* — Frank H. Foster; Kremblas & Foster

(57) ABSTRACT

The invention relates to a device and a method for the automated production of knotted dough products, in particular pretzels. Said device comprises: a shaping table (2) for horizontally supporting a U-shaped bent dough strand (46); a shaping tool (6) that can be activated to vertically support the U-shaped bent dough strand (46), the shaping table (2) and activated shaping tool (6) forming a common stop for the U-shaped bent strand (46); and a knotting head (9) for seizing the ends of the dough strand and for knotting said strand (46). According to the invention, the knotting head (9) can be displaced from a seizing position (48), in which the ends of the U-shaped bent dough strand (46) are seized, into an extension position (49), in which the dough strand is extended, then into a knotting position (51), in which the dough strand is knotted and finally into a placing position 52, in which the ends of the dough strands are placed on the central part of the dough strand. In addition, the common shaping stop is configured to be stationary, in particular on the horizontal displacement plane.

12 Claims, 8 Drawing Sheets

KNOTTING SYSTEM FOR A DOUGH STRAND

(b) CROSS-REFERENCES TO RELATED APPLICATIONS

Figure 1:
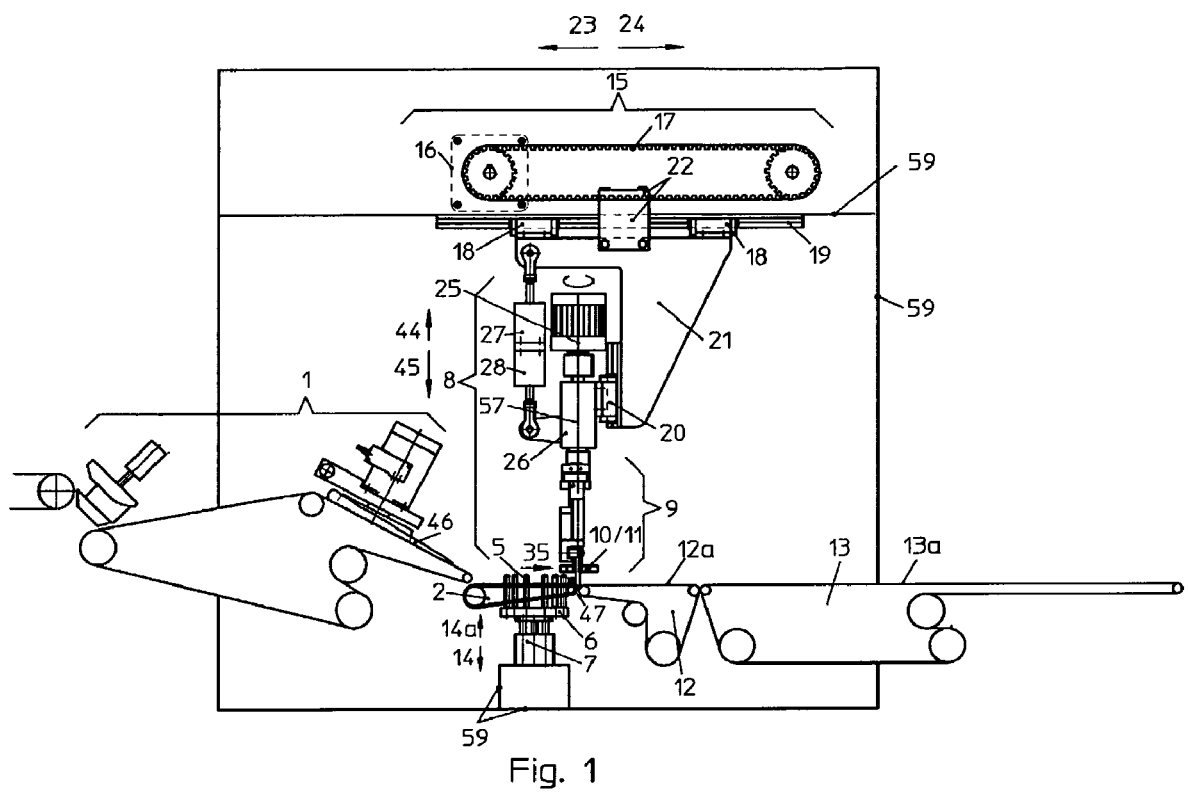

This application is division of U.S. application Ser. No. 10/585,521 filed Jul. 7, 2006, now abandoned, which is a submission to enter the national stage under 35 U.S.C. 371 for international application number PCT/EP2005/050078/ having international filing date 10 Jan. 2005, for which priority was based upon patent application Ser. No. 102004001792.1, having a filing date of 12 Jan. 2004 in Germany.

(c) STATEMENT REGARDING FEDERALLY-SPONSORED RESEARCH AND DEVELOPMENT (Not Applicable)

(d) REFERENCE TO AN APPENDIX (Not Applicable)

(e) BACKGROUND OF THE INVENTION

1. Field of the Invention

The invention relates to a method and apparatus for the mechanised production of knotted dough products, in particular pretzels made from dough strands. U.S. application Ser. No. 10/585,521, filed Jul. 7, 2006, and the other specifically enumerated parent applications from which priority is claimed above, are hereby incorporated herein by reference.

2. Description of the Related Art

The automatic manufacture of knotted dough products, in particular pretzels, is a huge technical challenge, since the tying of the dough strands is a very complex operation for manufacturing technology. Various attachments for automated pretzel manufacture are known from the prior art, as follows:

The patent specification DE 3841395 C1 from the Oswald Piller bakery describes a method and apparatus for manufacturing pretzels. As a starting product in the disclosed method or in the disclosed apparatus, a dough strand is used, which is grasped at its ends by suction cups. In a further step, the suction cups are raised with the dough strand ends and are displaced in the horizontal direction in such a manner that the dough strand middle portion is laid around a fixed stop. In further steps, the dough strand ends are tied together by rotation of the suction cups about a common axis and are deposited on the dough strand middle portion.

The following applications by the same Applicant suggested another method and have replaced the horizontal motion of the suction cups or other gripper devices with a horizontal motion of the stop around which the middle portion of the dough strand is laid. In this connection, we refer to printed specifications DE 4336329 C1, DE 4441301 C1 or also DE 19511409 C1.

The printed specification EP 1255441 B1 by the Applicant of the present patent application also describes a method and apparatus for manufacturing pretzels. In the disclosed manufacturing process, a dough strand curved in a U-shape is moved over a shaping table by means of conveyor belts. Through the shaping table, semi-circularly arranged holding pins engage, which together with the shaping table form a stop for the dough strand middle portion. In a first step the dough strand is moved against the stop by means of the conveyor belts and the dough strand ends are grasped at the end of the shaping table by gripper devices. In a second step, the dough strand is stretched by a specified degree of stretch in that the stop, in particular the holding pins, are displaced counter to the original conveying direction of the dough strand, the gripper devices holding the dough strand ends remaining stationary. In further steps, the gripper devices are moved into a tying position for tying of the dough strand ends and thereafter into a depositing position for depositing the dough strand ends on the dough strand middle portion.

The object of the invention is to create a method and apparatus of the type mentioned in the introduction which permit a structurally simplified, economical mechanised manufacture of knotted dough products with a reduced number of drive components.

(f) BRIEF SUMMARY OF THE INVENTION

The object is achieved by the manufacturing method indicated in the following description.

An apparatus on the basis of the invention is used for the mechanised manufacture of knotted dough products, in particular pretzels. Knotted dough products also comprise plaits, salt pretzels or other dough products which have a knotted section, in particular a knotted middle section. The knotted section may in this case have a single knot, i.e. a twisting of the dough strands through 360 degrees, or a multiple knot.

The apparatus has a shaping table, which makes available a horizontal contact surface for a dough strand advantageously curved into a U-shape. Preferably, the dough strands are moved in a conveying direction on the shaping table by means of conveyor belts. Further, the apparatus has a shaping tool which may be activated, i.e. switched on, which when switched on forms a vertical abutment for the dough strand curved into a U-shape, in particular for the middle portion of the dough strand curved into a U-shape. The abutment region of the moulding tool is formed into a circular or horseshoe shape at least in part when viewed in plan, in order to receive the central portion of the dough strand curved into a U-shape, which is semi-circular viewed in plan.

The shaping table and activated shaping tool form a common shaping stop for the dough strand curved into a U-shape, the dough strand resting on the shaping table and abutting the shaping tool.

The apparatus furthermore has a tying head, which is formed rotatable for grasping the dough strand ends and tying the dough strand, preferably by rotation about an axis of rotation (see also EP 1 255 441 B1).

The apparatus is furthermore so formed that the tying head may be moved from a gripping position, in which the dough strand ends of the dough strand curved into a U-shape are grasped, into a stretching position, in which the dough strand is stretched, to a tying position in which the dough strand is knotted, to a depositing position in which the dough strand ends are deposited on the dough strand middle portion. The tying head moves from the gripping position at first in the conveying direction of the dough strand, and then counter to the conveying direction of the dough strand to the tying position, and finally to the depositing position.

The common shaping stop formed by the shaping table and shaping tool is stationary, in particular not movable parallel to a floor plane or counter to the conveying direction.

In preferred embodiments of the apparatus, a feed device can be provided, which has a structure for shaping and/or feeding dough strands curved into a U-shape to the shaping table. In particular, the feed device can be formed as is described in EP 0 938 844 B1. Full account is taken of the disclosure of this printed specification. The feed device is preferably so formed that the dough strands are supplied shaped and/or aligned so that the dough strand ends are aligned parallel to the feed direction and/or conveying direction of the shaping table, in particular it can be provided that the dough strand arms are of equal length and/or are aligned in the feed direction and/or conveying direction.

In a preferred further embodiment of the apparatus, the shaping table has one or more parallel conveyor belts, which form the horizontal support for the dough strand curved into a U-shape (see also EP 1 255 441 B1).

The shaping tool may for example have pins and/or holding bodies, which are arranged in a horseshoe or semicircular shape, and in the activated state of the shaping tool form the abutment region for the middle portion of the dough strand curved into a U-shape. In particular, it can be provided that the pins and/or holding bodies engage through the conveyor belts or are disposed between these (see also EP 1 255 441 B1).

In a preferred embodiment, the shaping tool, in particular the pins and/or holding bodies, are only movable in the direction of the ground and in reverse. By corresponding movement in a usually vertical direction, the shaping tool can be switched on and off, i.e. activated or deactivated. In the deactivated state, the shaping tool is disposed countersunk in the shaping table and/or below the shaping table, in particular the end sections of the shaping tool do not project in the vertical extension beyond the support surface formed by the shaping table. In the activated state, the shaping tool and the shaping table cooperate in such a manner that a common shaping stop is formed for the dough strand curved into a U-shape. In particular, the shaping tool, notably the pins and/or holding bodies, engage through the conveyor belts in order to form the common stop.

In a preferred embodiment, the tying head comprises at least two gripping devices for gripping the dough strand ends. In particular, it can be provided that each of the gripping devices is disposed eccentrically on a pivot drive allocated thereto, which permits a pivoting movement of the gripping device in a horizontal plane parallel to the ground (see also EP 1 255 441 B1).

Preferably, the tying head can be rotated by means of a rotary drive about a vertically extending axis of rotation, which is disposed symmetrically between the gripping devices. In particular, this axis of rotation is disposed parallel to the pivotal axes of the pivot drives (see also EP 1 255 441 B1). In alternative embodiments, the axis of rotation can also be disposed inclined, in particular in order to modify the position and formation of the tied region of the dough products.

In a preferred embodiment of the apparatus, the rotary drive is formed as an endless rotary axis and/or as a servo or stepper motor. Such an embodiment permits preferably in a programme-controlled manner, rotation of the tying head through one, two and/or plural revolutions. This embodiment makes possible the manufacture of dough products with multiple knots in their middle portion, e.g. such as plaits or salt pretzels.

In a preferred further embodiment of the apparatus, a rotary duct is provided on the rotary drive, through which control signals and/or supply signals for the tying head are passed, so that endless rotation is made possible. With such a rotary duct, rotations of the tying head do not have to be made in reverse in order to untangle the signalling and supply lines otherwise required.

To move the tying head, a linear drive can further be provided, which permits displacement in a vertical direction, preferably perpendicular to the upper face of the shaping table and/or parallel to the axis of rotation of the rotary drive. In the case of simple embodiments, this linear drive can be formed as at least two hydraulic jacks connected in series, so that the tying head can adopt at least three different vertical positions. Alternatively, the linear drive can be also formed as a programme-controlled actuator, so that the vertical position of the tying head may be adjusted infinitely variably.

The apparatus may further have a linear axis for displacing the tying head in the horizontal direction, preferably parallel to the conveying direction of the conveyor belts. The tying head is movable by means of this linear axis in the horizontal plane between the gripping position, stretching position, tying position and depositing position.

In a preferred embodiment, the linear axis, the linear drive disposed perpendicular thereto and aligned in particular in an overall vertical direction and the rotary drive preferably disposed with its axis of rotation parallel to the linear drive, form a cinematic chain. Alternatively, this cinematic chain may also be provided by another guidance system, in particular an articulated-arm robot.

In a practical further embodiment of the apparatus, sensors are provided for detecting the dough strand ends. Preferably, the sensors are so formed and/or arranged that dough strand ends of dough strands preferably curved into a U-shape may be detected. In particular, two sensors may be provided, in which case for each of the two sensors a respective dough strand end may be detected independently of the other sensor.

In an advantageous further embodiment, the gripping position of the gripping devices is connected downstream of the measuring position of the sensors in the conveying direction. In other words, the sensors are so arranged that the dough strand ends of the dough strand curved into a U-shape resting on the shaping table may be detected by the sensors as soon as they run into the gripping device.

In a preferred embodiment of the apparatus, two sensors are disposed laterally on the shaping table, opposite one another at the same height, and the two sensors form a measuring line and/or a measuring plane, which is disposed perpendicular to the conveying device and/or at least partly above the shaping table. Preferably, the sensors are disposed in the rear half or in the rear end section of the shaping table viewed in the conveying direction, e.g. above the rear deflection sheave of the conveyor belts. Advantageously, the position of the sensors is so selected that the dough strand ends are detected immediately before the end of the conveyor belt or within the second half of the shaping table.

For conveying the knotted dough products away, a discharge device can be connected downstream of the shaping table, in which case a gap or intermediate region is provided between the shaping table and the discharge device, into which gap the gripping devices of the tying head engage in the gripping position at least in parts. By this structural configuration it is possible that the gripping devices can grip the dough strand ends overhanging the shaping table end in a plane which is formed by the dough strand middle portion resting on the shaping table. Thus particularly reliable gripping is ensured.

In an advantageous embodiment of the invention, a control is provided with which the degree of stretch d may be set by which the dough strand is stretched. The degree of stretch may describe the differential value by which the dough strand is stretched. The degree of stretch may however also describe the absolute value to which the dough strand is stretched. Preferably, the differential degree of stretch may be set in a range of between 10 mm and 150 mm or in a range of between 50 mm and 120 mm.

In an advantageous further embodiment, the control comprises a database system, in which parameters specific to the method and/or parameters specific to the product are stored, in which case preferably the parameters specific to the method are linked to the parameters specific to the product. The parameters specific to the method may in this case, for example, comprise the number of rotations of the axis of rotation and/or the absolute degree of stretch and/or the differential degree of stretch and/or the position coordinates for the adjustment motion of the tying head. The parameters specific to the product comprise for example the type of dough product and/or characteristic variables of the dough material. Preferably, the parameters specific to the product and to the method are linked via a dough product data encryption key and the control is formed by programming technology, so that after inputting of the dough product data encryption key, the associated product- and method-specific parameters are loaded into the control automatically.

The method according to the invention is advantageously carried out with the apparatus described or with an apparatus according to one of the claims and/or to an apparatus having one or more features of the claims.

In a first step of the method according to the invention, the dough strand ends of a dough strand preferably curved into a U-shape are received by a tying head, which is located in a gripping position. Preferably—particularly in order to keep the cycle times to a minimum—the dough strand is fed into the position in which it is received, already curved into a U-shape.

In a second step, the curved dough strand is stretched by a specified degree of stretch. In this stretching, the middle portion of the dough strand is held fast by a stationary stop and stretching is effected by displacing or moving the tying head preferably in the conveying direction of the shaping table.

In a third step the tying head is moved into a tying position in which the dough strand is tied, i.e. the dough strand ends are twirled together. Preferably, it is provided that the tension in the dough strand created by stretching is kept constant at least up to half-way through the tying operation. The maintenance of tension results in the tied region, in particular the pretzel knot, being so firmly knotted that during an optional subsequent salting operation no or relatively little salt solution can penetrate into the knotted region. Particularly advantageously, tying guide elements are switched on which during the tying operation or at least in the first half of the tying operation preferably completely encompass and/or guide the dough strand arms.

In a fourth step the tying head is moved into a depositing position in which the dough strand ends are deposited on the dough strand middle portion. Preferably, the dough strand ends are not only deposited, but pressed on to the dough strand middle portion.

In a preferred embodiment of the method, the dough strands preferably curved in a U-shape are supplied by means of a feed device and/or are passed on by means of a conveyor device, in which case the dough strand ends are aligned in the feed direction and/or conveying direction. The leading dough strand ends are detected by sensors and/or sensor devices, the dough strand ends being located in the same plane as the dough strand middle portion, in particular rest on the same plane.

Preferably, after detection, the detected dough strand ends are grasped by gripping devices. These gripping devices are connected downstream of the sensors in the conveying direction. In particular, the dough strand ends are grasped as soon as they project over the end edge of the conveying device and in particular in such a manner that the dough strand ends do not or only negligibly bend downwards due to the force of gravity, but are still located in one plane with the dough strand middle portion and/or the underside of the dough strand ends lies in one plane with the underside of the dough strand middle portion.

Advantageously, the tension built up in the dough strand during stretching is maintained up to the tying step, in particular in order to support the formation of a tightly-formed knot. The tension is preferably maintained up to a ¾-rotation of the tying head. Further, particularly advantageously, knot guiding elements can be provided which during the tying process preferably completely encompass or engage around the dough strand arms and support the maintenance of tension and the controlled positioning of the knot. This has a positive effect also on the shape-keeping of the finished, tied pretzel.

Advantageously, in order to adopt the stretching position, a distancing movement is imparted to the tying head, so that the distance from the stationary stop is increased. Particularly advantageously, in this case, a motion component transverse to the dough strand conveying direction is imparted to the self-distancing tying head, which results in a direction of motion which extends obliquely upward with respect to the dough strand conveying direction for example. Thus friction between conveyor belts of the shaping table and the dough strand is avoided.

Both in order to reach the tying and the depositing position, the direction of movement of the tying head then has to be advantageously reversed, i.e. oriented counter to the dough strand conveying direction. The tying of the dough strand is effected advantageously with clearance from the support surface of the shaping table, whilst in order to deposit the dough, the tying head is moved further counter to the conveying direction and is lowered simultaneously with the dough-strand intermediate section (further overlapping of a transverse movement).

Further features, details, advantages, combinations and effects on the basis of the invention will appear from the following embodiment. The drawings show:

(g) BRIEF DESCRIPTION OF THE SEVERAL VIEWS OF THE DRAWINGS

Figure 2:
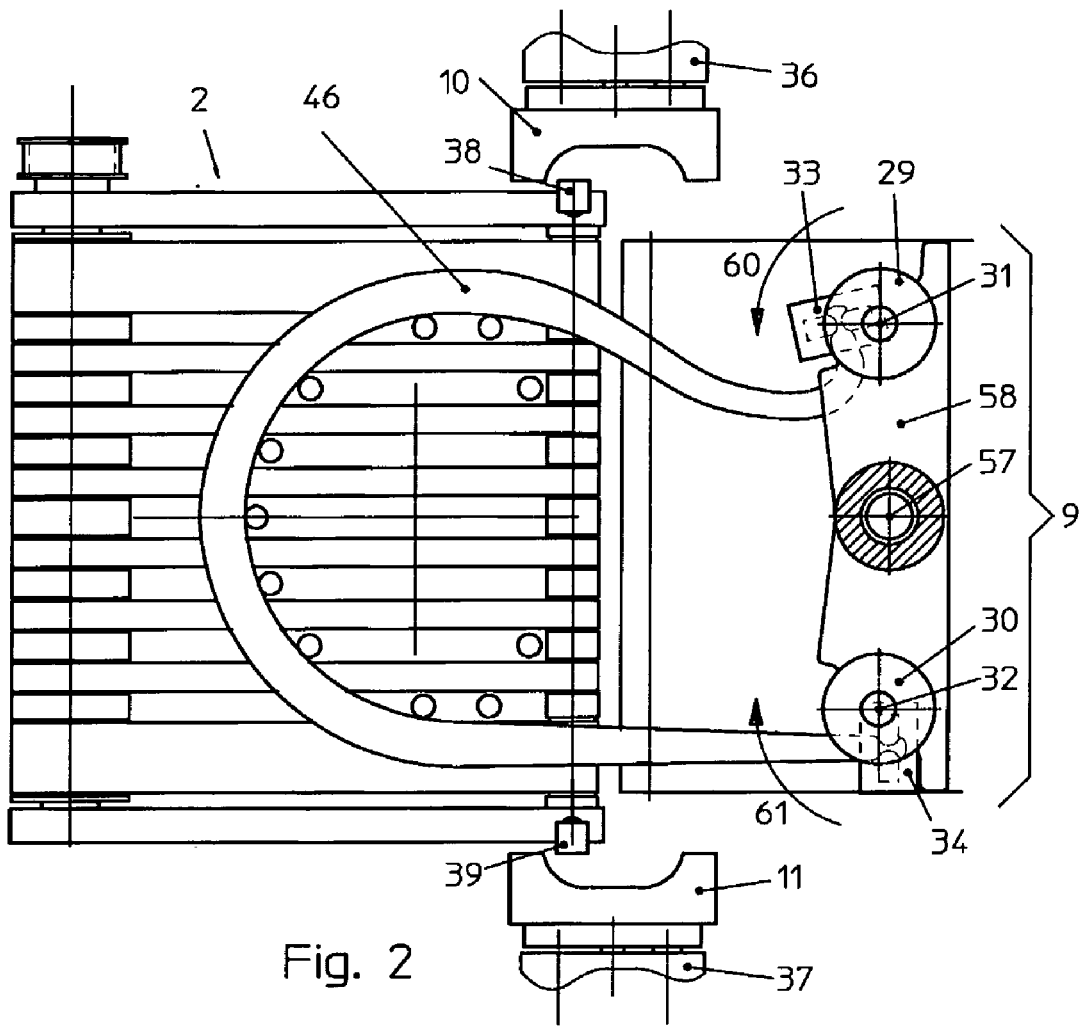
Figure 3:
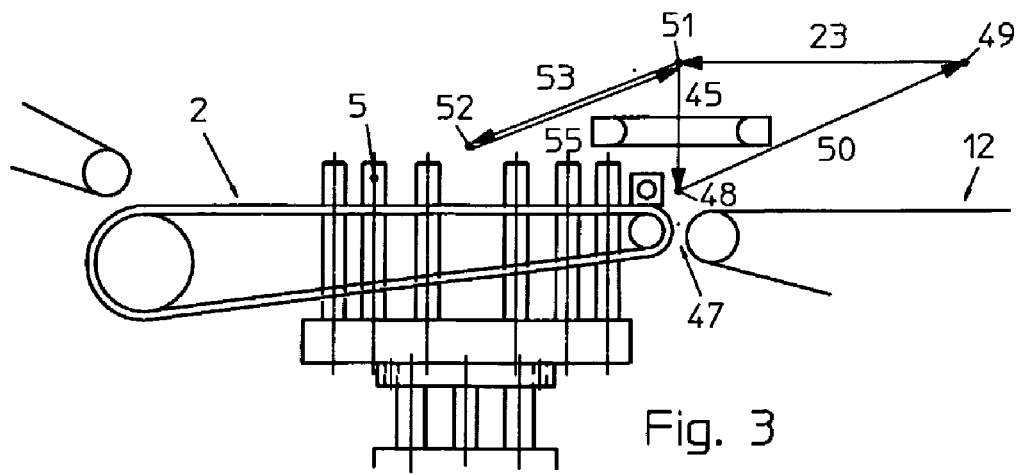
Figure 4:
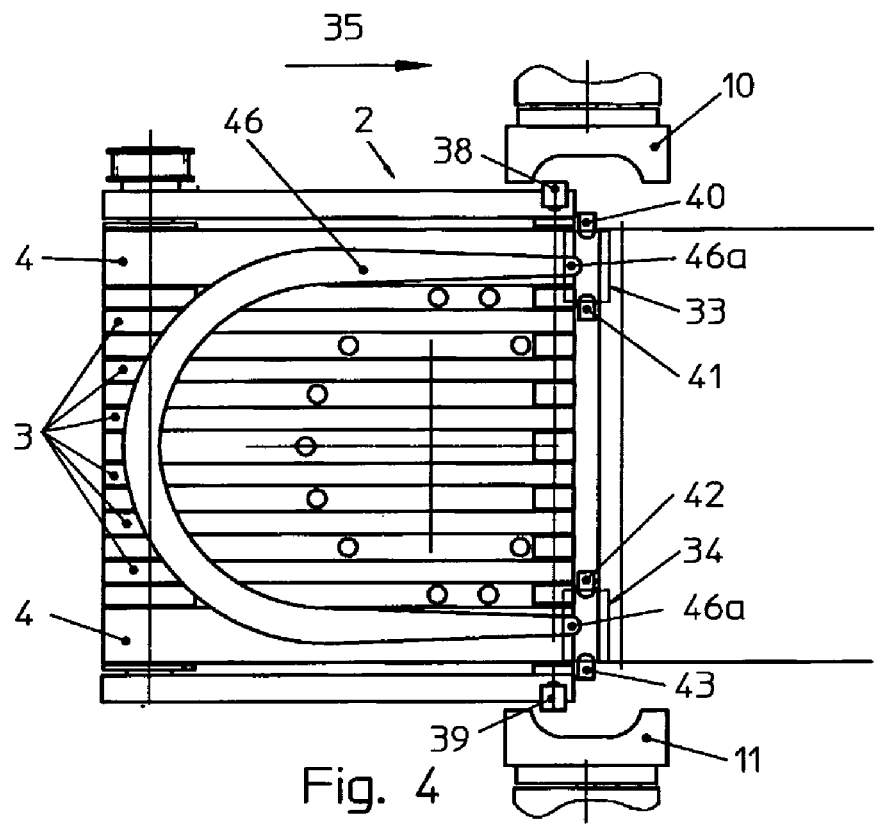
Figure 4A:
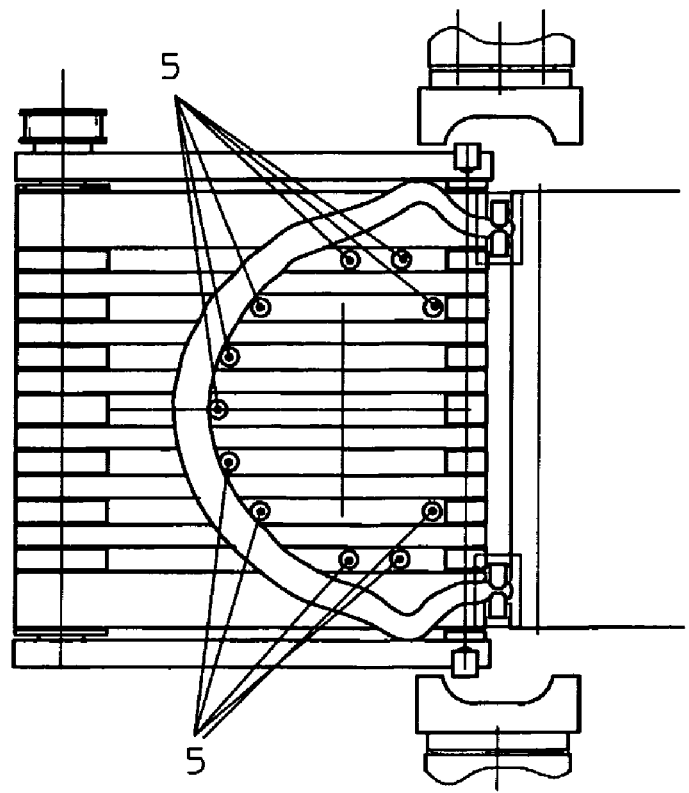
Figure 5A:
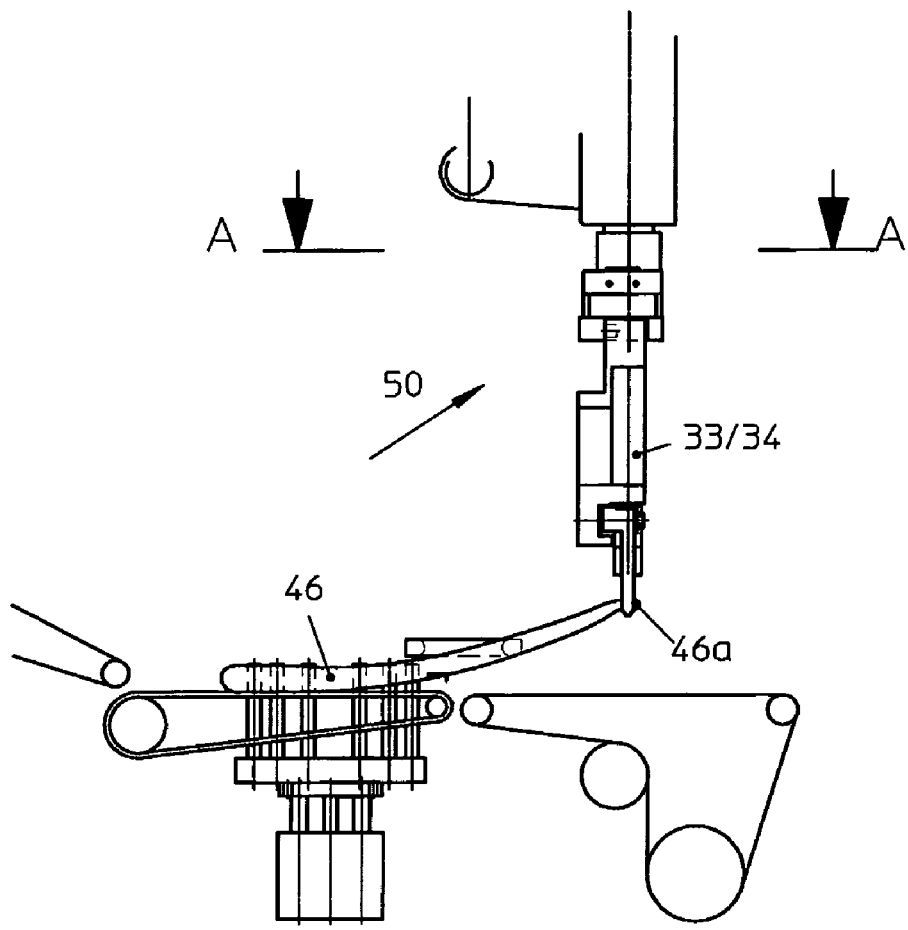
Figure 5:
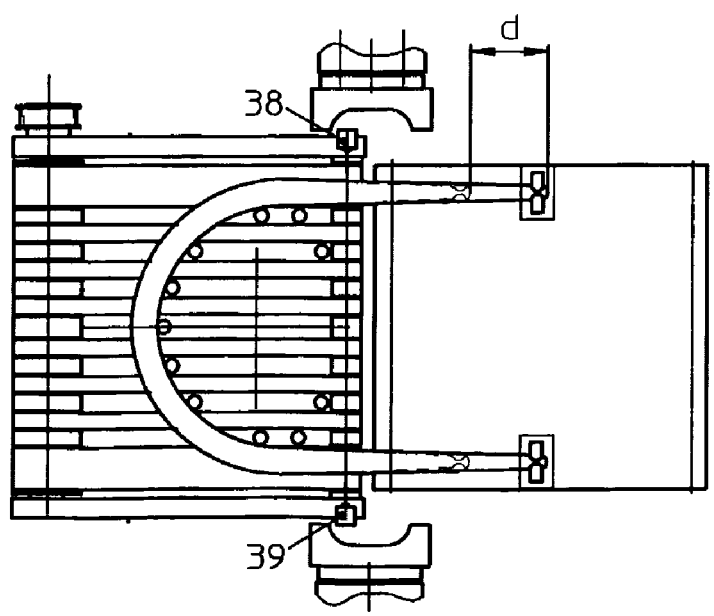
Figure 6A:
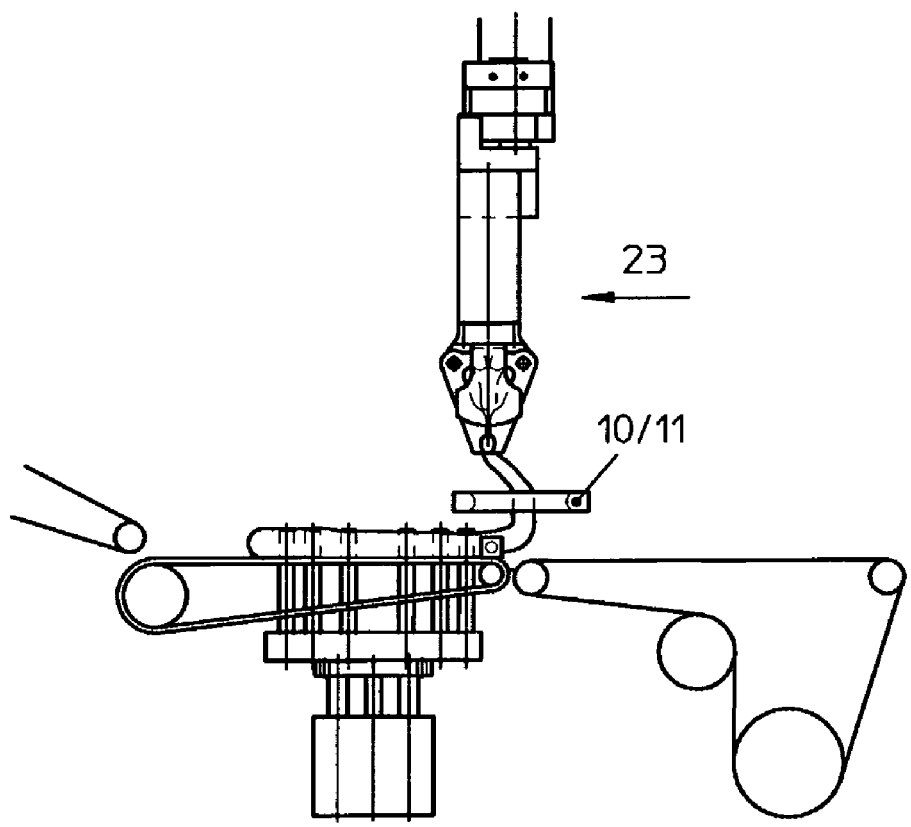
Figure 6:
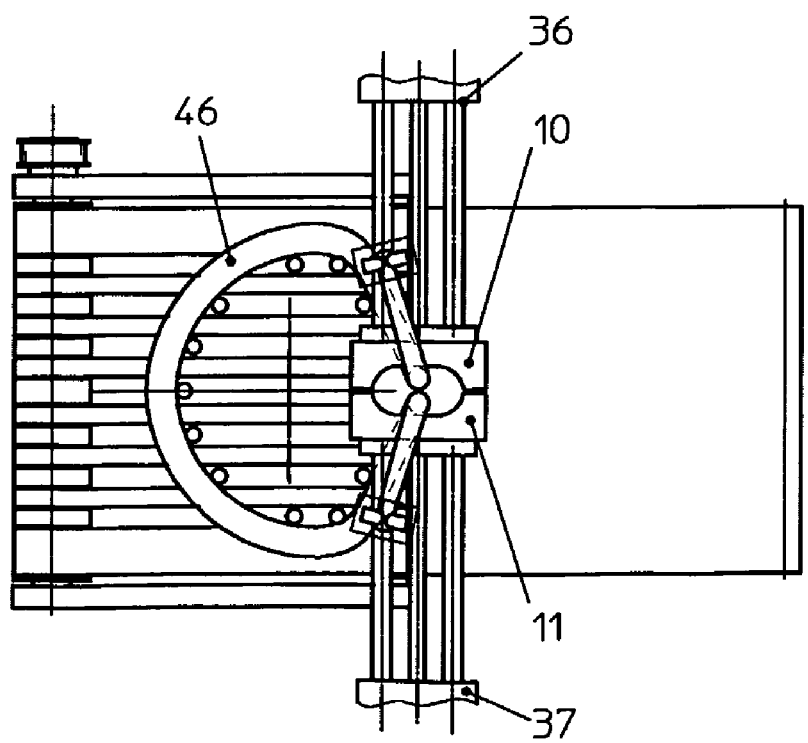
Figure 7A:
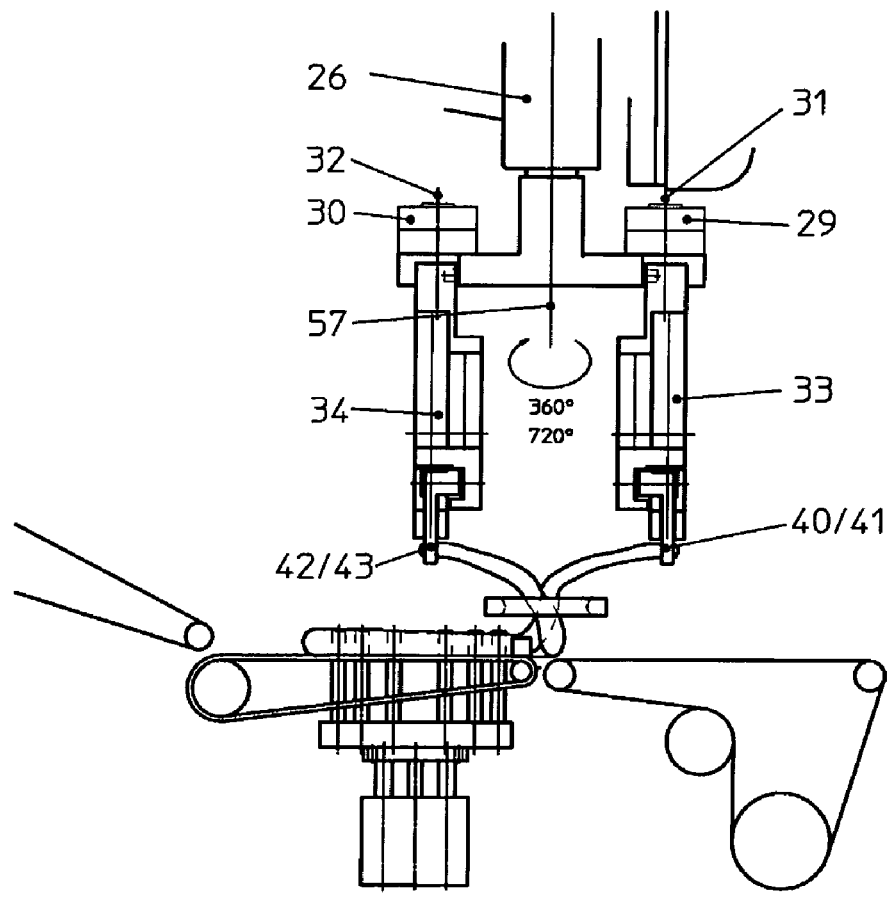
Figure 7:
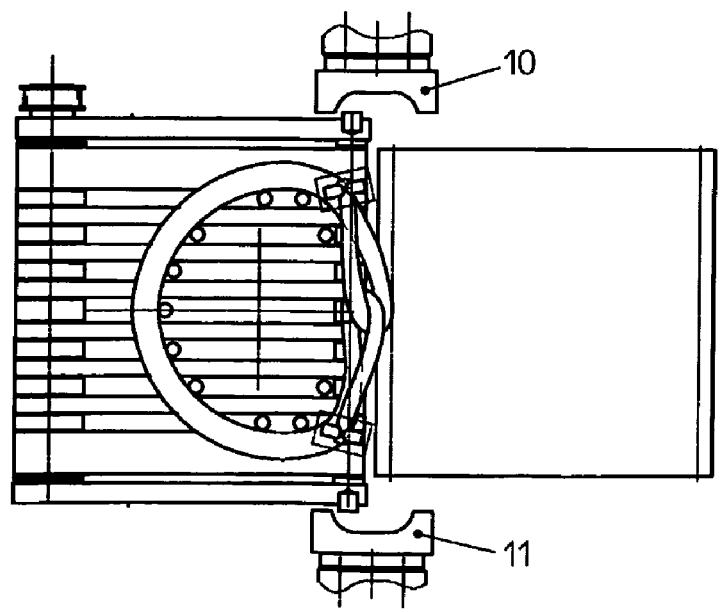
Figure 8A:
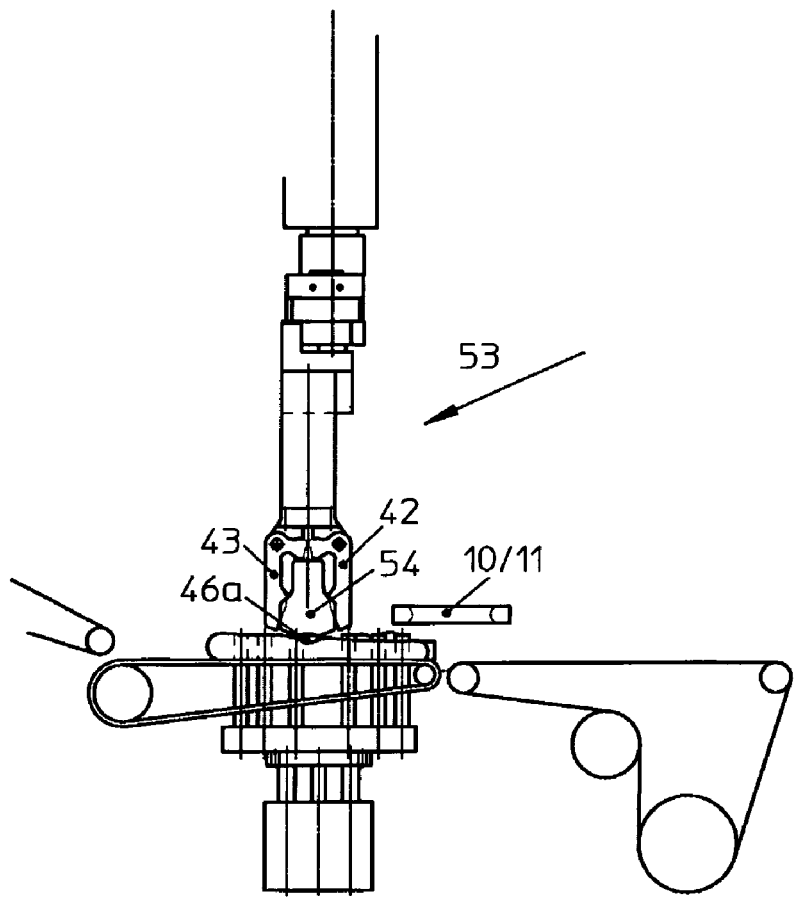
Figure 8:
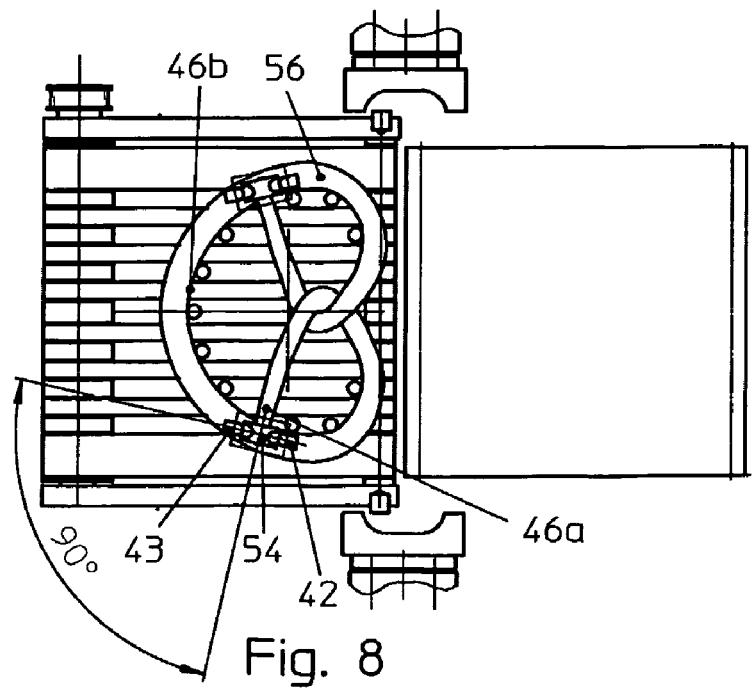
Figure 9A:
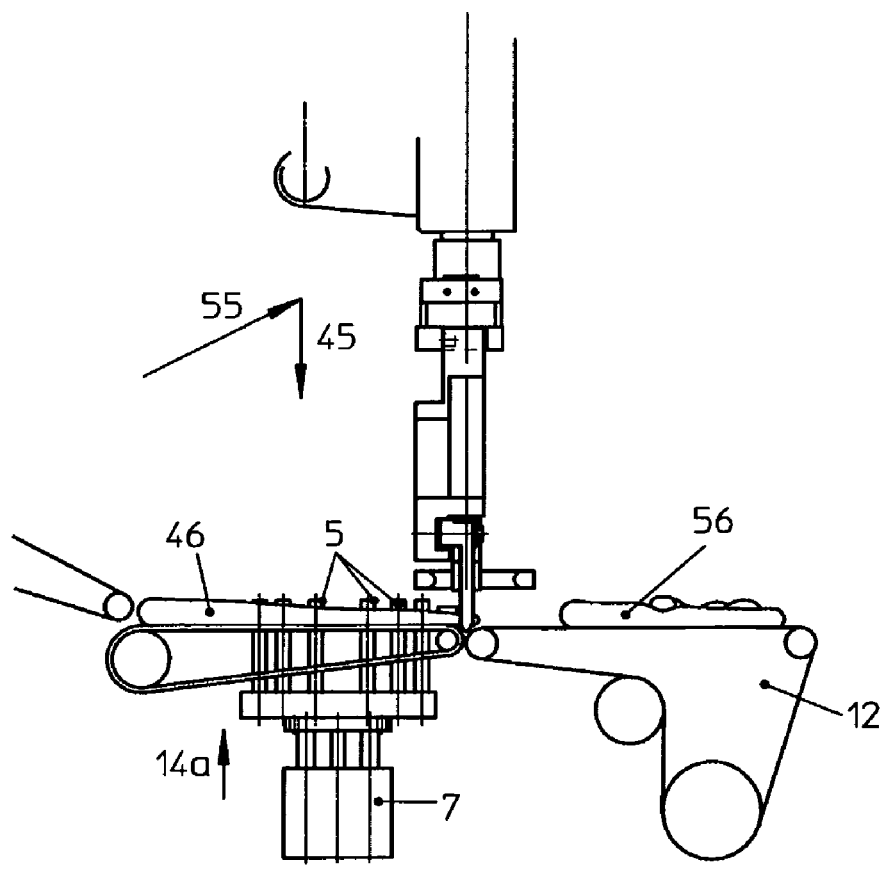
Figure 9:
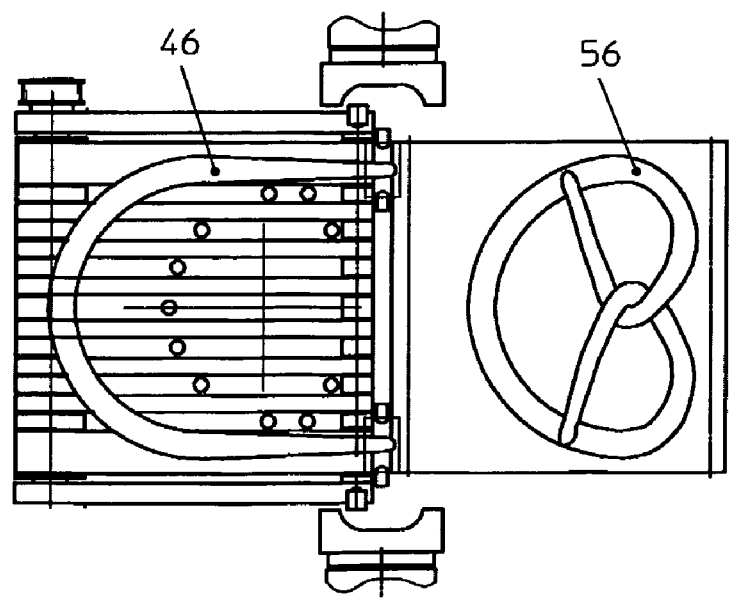

FIG. 1, a side view of an embodiment of a pretzel tying apparatus,

FIG. 2, a plan view of the shaping table 2 in FIG. 1 with a partial view of the tying head 9, along the section line A-A in FIG. 5a, the left-hand gripping device being shown in a pivoted position, FIG. 3, a side view of the shaping table 2 in FIG. 1 with diagrammatically illustrated path of the tying head 9 relative to the dough strand ends 46a during the tying operation, FIG. 4, a plan view of the shaping table 2 in FIG. 1 with a partial view of the gripper fingers 40/41 and 42/43 of the left- and right-hand gripping device 33/34, a dough strand 46 running into the gripping device 33/34 being also shown, FIG. 4a, a plan view of the shaping table 2 in FIG. 1 with dough strand ends 46a gripped by the gripper fingers 40/41 and 42/43, FIG. 5, a plan view of the shaping table 2 in FIG. 1 with illustration of the completed stretching operation by the degree of stretch d, FIG. 5a, a side view of the apparatus according to FIG. 5 with section A-A, FIG. 6, a plan view of the shaping table 2 in FIG. 1 with closed knotting, tying and guide part 10 and 11, and with the pivoted gripping devices 33 and 34, the dough strand 46 adopting an omega shape, FIG. 6a, a side view of the apparatus according to FIG. 6, FIG. 7, a plan view of the shaping table 2 in FIG. 1 with formed pretzel knots and open knotting, tying and guide part 10 and 11, FIG. 7a, a side view of the apparatus in FIG. 7, wherein deviating from FIG. 7, the tying head 9 is shown rotated through 90°, FIG. 8, a plan view of the shaping table 2 in FIG. 1 with ready-tied pretzel blank 56, FIG. 8a, a side view of the apparatus according to FIG. 8 with illustration of the open gripper fingers and extended pressure rams 54 for laying and pressing of the pretzel strand ends 46a on to the pretzel strand middle portion 46b, FIG. 9, a plan view of the shaping table 2 in FIG. 1 and the intermediate table 12 with fully tied pretzel blank 56 and newly arriving pretzel strand 46 curved in a U-shape, FIG. 9a, a side view of the apparatus according to FIG. 9.

(h) DETAILED DESCRIPTION OF THE INVENTION

German patent application serial number 102004001792.1, having a filing date of 12 Jan. 2004, the above claimed priority application, is incorporated in this application by reference.

The pretzel manufacturing apparatus comprises a feed device 1, with which dough strands curved in a U-shape are prepared and fed to a shaping table 2; the shaping table itself 2, on which by using a tying device 8 the dough strands curved in a U-shape are tied into pretzels; and an intermediate table 12 and a discharge table 13 for conveying the tied pretzels away.

The sequence of the method for manufacturing pretzels is briefly as follows: A straight dough strand (not shown) is fed into the feed device 1 by means of a further conveyor belt, the dough strand being disposed horizontally and perpendicular in its longitudinal extension to the feed direction. The feed device 1 forms the straight dough strand into a dough strand 46 curved in a U-shape, whose free dough strand ends are aligned in the feed direction. With this alignment, the dough strand 46 curved in a U-shape is transferred to the shaping table 2, which conveys the same further in a conveying direction until it reaches a working position, in which the dough strand is tied into a pretzel. The feed direction and the conveying direction are identical in the pretzel manufacturing apparatus in FIG. 1 and correspond to the conveying direction 35. The working position is specified by a stop, which is formed by the shaping table 2 as a horizontal support and by the holding pins 5 gripping the shaping table 2 as a vertical abutment. In the working position, the dough strand middle portion is held in its position with positive locking by the said stop in the conveying direction. The dough strand ends are grasped by a tying head 9 of the tying device 8. In the further course of the method, the tying head 9 moves first into a stretching position 49, in order to stretch the dough strand to a specifiable length, then into a tying position 51, in which the dough strand arms are knotted together, and finally into a depositing position 52, in order to deposit the dough strand ends on the dough strand middle portion. In a last step, the pretzel formed is conveyed away over the intermediate table 12 and the discharge table 13.

The feed device 1 for preparing the dough strands curved in a U-shape, in particular for bending, measuring and alignment of the U-shaped dough strands, is known from the patent EP 0 938 844 B1. For structural details of the feed device, the description of that patent is referred to.

From the feed device 1, the dough strand 46 curved in a U-shape with the dough strand ends is transferred in advance to the shaping table 2, in which case the dough strand arms are formed preferably of equal length and parallel to one another and to the conveying direction 35. The shaping table 2 is shown, apart from the diagram in FIG. 1, in an enlarged side view in FIGS. 3, 5a, 6a, 7a, 8a and 9a, and in enlarged plan view in FIGS. 4, 4a, 5, 6, 7, 8 and 9.

The shaping table 2 is formed as a conveyor belt for bringing the dough strand 46 curved in a U-shape to the working position and for removing the tied pretzel blank 56 after the tying operation. To this end, the shaping table 2 comprises two horizontal and parallel deflection sheaves for deflecting a plurality of narrow and wide conveyor belts 3 and 4, which are mounted parallel to the conveying direction of the shaping table 2 and are used for supporting and conveying the dough strand curved in a U-shape or of the finished pretzel. The narrow and wide conveyor belts 3 and 4 are arranged parallel to one another and between the conveyor belts respective gaps are provided. The narrow conveyor belts 3 are located in a central region of the shaping table 2, which is defined by two wide conveyor belts 4 in the peripheral region. As can be seen from FIGS. 4 and 4a, the area of the narrow conveyor belts 3 perpendicular to the conveying direction is sufficiently wide that the dough strand middle portion of the dough strand 46 curved in a U-shape can be laid thereon, while the dough strand arms rest on the wide conveyor belts 4.

The dough strand 46 curved in a U-shape is moved by the conveyor belts 3 and 4 in the conveying direction 35 until the dough strand middle portion abuts a stop, which is formed by a plurality of vertically aligned holding pins 5 disposed in a semicircle viewed in plan. The holding pins 5 are part of a pretzel shaping tool 6 and are disposed in the gaps between the conveyor belts 3 and 4 so that they engage through the shaping table 2. The lower part of the pretzel shaping tool 6 is disposed on a hydraulic jack 7 with a generally vertical stroke direction, which is located below the shaping table 2. The hydraulic jack 7 is fixed to a fixed base frame 59, so that the pretzel shaping tool 6 is displaceable in the vertical direction 14 with respect thereto. By means of the hydraulic jack 7, the pretzel shaping tool 6 can thus be moved in the vertical direction 14 between two positions. In the first, upper position, the hydraulic jack 7 is extended, so that the holding pins 5 project beyond the upper face of the conveyor belts 3 and 4 and form a stop for the dough strand 46. In this position, the pretzel shaping tool 6 is switched on, as is shown in FIGS. 3, 4a, 6a, 8a and 9a. In the second, lower position, the hydraulic jack 7 is retracted, so that the holding pins are countersunk in the shaping table 2, so that a pretzel 56 lying on the shaping table 2 can be moved on by means of the conveyor belts 3 and 4 to the intermediate table 12. Preferably, the pretzel tool 6 is disposed with the holding pins 5 in the conveying direction 35 in the second half or at the end of the shaping table 2.

Above the shaping table 2, transverse to the conveying direction 35, are located the knotting, tying and guide parts 10/11 (cf. FIG. 2) displaceable by hydraulic jacks 36/37, which are explained more fully with reference to FIG. 6.

As is best visible from FIG. 4, at the side of the shaping table 2, a sensor 38 or 39 is mounted above the deflection sheave of the conveyor belts 3 and 4 which is to the rear in the conveying direction 35, the sensors opposing one another and their measuring directions being formed perpendicular to the conveying direction 35. The sensors 38 and 39 detect the dough strand ends of the dough strand 46 curved in a U-shape conveyed by the conveyor belts 3 and 4, the detection of the dough strand ends being effected in particular during conveying of the dough strand 46 in the conveying direction. As soon as the dough strand ends pass the sensors 38 and 39, signals are transmitted to the control, which triggers the grasping of the dough strand ends by the tying device 8. Preferably, the dough strand ends are detected independently of one another, so that also different lengths of dough strand arms can be detected and received adapted by the tying device 8.

The tying device 8 consists essentially of a rotary drive 25, the rotary duct 26 and the tying head 9 and can be moved via a Cartesian robot with two linear degrees of freedom. The Cartesian robot comprises a horizontal linear drive 15 and a further, vertical linear axis disposed perpendicular thereto.

The linear drive 15 is formed as a guide rod 19, which is disposed horizontally parallel to the conveying direction 35 and is rigidly connected to the base frame 59, and two guide carriages 18, which are attached in the guide rod 19. The drive of the guide carriages 18 is effected with a drive motor 16, which moves the guide carriages 18 via a toothed belt 17 disposed parallel to the guide rod 19 and a connecting part 22. The drive motor 16 is also rigidly connected to the base frame 59.

A holding part 21 is suspended on the guide carriages 18, on which holding part the further linear axis is mounted, which is oriented in a vertical direction and perpendicular to the linear drive 15 and is realised with two hydraulic jacks 27 and 28 connected in series. By the hydraulic jacks 27 and 28 connected in series, four different vertical positions can be achieved, provided that the hydraulic jacks have a different stroke height. If the hydraulic jacks 27 and 28 are formed identically, only three different height positions can be achieved. Alternatively to the hydraulic jacks 2728, a programme-controlled actuator could also be used, which would be attached to the holding part 21 and connected via a toothed belt drive to the rotary duct 26. Thus the versatility could be further increased, since any position in the range of adjustment of the running direction 44/45 could be reached.

As a further member of the cinematic chain, the rotary drive 25 of the tying device 8 is provided, which is mounted on the further linear axis and is thus movable by the linear drive 15 and the further linear axis. Additionally, in particular in order to increase the rigidity of the guide system, a vertical guide 20 is provided, which is on the one hand rigidly connected to the holding part 21 and on the other hand guides and stabilises in the vertical direction the rotary drive 25 including the tying head 9 guided with the rotary drive 25, i.e. the whole tying device 8. The axis of rotation 57 of the rotary drive 25 is oriented vertical and parallel to the further linear axis. Via the rotary drive 25, preferably formed as a programme-controlled servo or stepper motor drive, the tying head 9 can be rotated about the vertical axis 57 by one)(360°, two)(720° or more revolutions. Thus it is possible according to the proposed method to manufacture pretzels with a knot having one or more twists.

Overall, the tying device 8 is therefore connected, via the vertical guide 20 and the holding part 21 and the connecting part 22, to the toothed belt drive 17 in such a manner that the tying device 8 can be moved via the linear actuator 15 and the guide 18/19 and a programmable control (not shown) both in the directions 23 and 24, i.e. in and counter to the conveying direction 35.

The tying head 9 comprises—as can be best seen from FIGS. 2 and 7a—at the upper end a yoke 58, which has in the sectioned side view of FIG. 7a a rotated T-shaped cross-section. The middle arm of the yoke 58 of T-shaped cross-section forms the axis of rotation about which the tying head 9 can be rotated by means of the rotary drive and is connected via a shaft to the rotary drive. The axis of rotation of the yoke 58 in this case corresponds to the vertical axis of rotation 57. At the free ends of the yoke 58, gripping devices 33 and 34 respectively are provided. The gripping device 33 and 34 respectively comprises a pair of gripper fingers 40/41 and 42/43 for grasping and holding the dough strand ends, each pair of gripper fingers being mounted eccentrically on a pivotal drive 29 and 30 respectively with a vertical pivotal axis 31 and 32 respectively. This arrangement makes it possible that the dough strand ends gripped can each be pivoted about the vertical pivotal axis 31 and 32 respectively eccentrically in a horizontal plane of motion. It is thus possible to displace the gripping device 33 and 34 respectively from the gripping position 48 transverse to the conveying position 35 directly corresponding to the subsequent depositing position 52.

An intermediate table 12 and a discharge table 13 are connected downstream of the shaping table 2.

The shaping table 2 with the conveyor belts 3/4, the pretzel shaping tool 6 with the holding pins 5 and the hydraulic jack 7, the tying device 8 with the rotary or tying head 9, and the intermediate table 12 with the conveyor belt 12a and the discharge table 13 with the conveyor belt 13a are also known from the patent EP 1 255 441 B1.

FIG. 4 shows a plan view of the shaping table 2 while a dough strand 46 curved in a U-shape is conveyed on the shaping table 2 by means of the conveyor belts 3 and 4. The pretzel tool 6 with the holding pins 8 is moved into the uppermost position by extension of the hydraulic jack 7 (direction 14a), so that the holding pins 5 form an abutment for the dough strand middle portion.

The tying head 9 is located in the gripping position, which means that the gripper fingers 41/41 and 42/43 respectively of the tying head 9 are so positioned at the end of the shaping table 2 in an intermediate region 47 between the shaping table 2 and the intermediate table 12, that the gripping region of the gripper fingers 40/41 and 42/43 respectively are disposed in extension of the dough strand arms of the dough strand 46. The tying device 8 with the tying head 9 is in this case located in the position 48, as is shown in FIG. 3, in which case the tying device 8 is located in the lowest position by extension of the two hydraulic jacks 27/28 in the direction 45.

The U-shaped dough strand 46 coming from the feed device 1 (cf. FIG. 1) is moved by means of the conveyor belt 3/4 of the shaping table 2, whilst the sensors 38/39 try to detect the dough strand ends 46a. After the sensors 38/39 have detected the dough strand ends 46a, via a control not shown, the grippers 40/41 of the left-hand gripper 33 are triggered for closing, gripping and holding on to one of the dough strand ends 46a (cf. FIG. 4a). The same applies to the sensor 39 with the right-hand gripping device 34 (cf. FIG. 4a). Thus opposing dough strand ends 46a which are not congruent can also be grasped independently and separately from one another in a precise position, in spite of bends in individual dough strand arms due to bunching. The conveyor belts 3/4 of the shaping table 2 in this case carry on running until the dough strand middle portion is abutting the holding pins 5 of the pretzel tool 6 according to FIG. 4a.

FIGS. 5 and 5a illustrate the stretching step. After gripping of the dough strand ends 46a, the U-shaped dough strand 46 is immediately drawn taut via the movement of the tying device 8 via the linear actuator 15 in the direction 24, and is stretched at the same time by a degree of stretch d according to FIG. 5/5a. In order to save time, the movement sequences are partly overlapping. To this end, the tying device 8 with the tying head 9 is moved during movement from the gripping position 48 (cf. FIGS. 3/5/5a) by simultaneous triggering of the actuator 15 in the horizontal direction 24 and of the hydraulic jack 27/28 in the vertical direction 44 into the stretching position 49. The resultant direction of motion 50 (see FIG. 3) prevents friction arising between the arms of the dough strand 46 and the conveyor belts 3/4 and 12a and hence a uniform stretch constant is prevented in the dough strand arms.

FIGS. 6 and 6a show the first phase of the tying operation proper. By horizontally moving the tying device 8 via the linear actuator 15 to the left in the direction 23, the tying device 8 is moved into the pretzel tying position 51 (cf. FIGS. 3/6/6a). This may lie in the same horizontal position as the gripping position 48. The tying process can also be started even before reaching the pretzel tying position 51. During displacement of the tying device 8 in the direction 23, at the same time, in particular overlapping therewith, the following sequences can be started via the control (not shown) according to the distance already covered:

Via the vertical axes of rotation 31/32, the gripping devices 33/34 are moved towards one another in the pivoting direction 60/61 (FIG. 2) until the respective dough strand ends 46a form an approximate right-angle with the already-tied pretzel (FIG. 8). Thus the subsequent depositing position 52 is prepared.

Furthermore, by extending the hydraulic jacks 36/37 and the knot-tying guides 10/11, the shape of an omega is imparted to the dough strand 46 (FIGS. 6/6a). The knot-tying guides 10/11 are formed as two guide half-shells, so that by extending the hydraulic jacks 36/37 the knot-tying guides disposed in their rest position opposite one another laterally on the shaping table 2 form a common, closed tying guide, which is oval in cross-section viewed in plan. Alternatively, the guide half-shells may be formed as U-shaped, open guide profiles, the aperture facing in the conveying direction 35 towards the intermediate table 12. The underside of the tying guide formed from the knot-tying guides is located approx. 2 to 3 cm above the shaping table 2 and is disposed centrally at the end of the shaping table 2. In a tying guide with such features, the dough strand arms can be advantageously guided over a length of about 2 to 20 cm extending in the conveying direction 35.

FIGS. 7a and 7 show the further steps of the tying process proper: the tying head 9 is rotated through one (360°), two (720° or more revolutions via the rotary drive 25 about a vertical axis 57 in order to form the knot. After roughly three quarters of the angle of rotation of the tying head 9, the knotting and tying guides 10/11 can be opened via the retraction of the hydraulic jacks 36/37.

Simultaneously the tying device 8 with the tying head 9 is advanced via the actuator 15 further in the horizontal direction 23 and in the vertical direction 45 into the adjustable depositing position 52 (according to FIGS. 3/8/8a) by extension of the hydraulic jack 28. Thus the resultant direction of motion 53 is achieved. The depositing position 52 is for depositing the dough strand ends 46a at the specified position of the pretzel. By opening the grippers 40/41 and 42/43 and simultaneous extension of the pressing ram 54 between the grippers, the pretzel strand ends 46a are pressed on to the dough strand middle portion 46b (see FIG. 8/8a). The pretzel blank 56 is now finished.

For further conveying in the direction 35, the holding pins 5 are retracted from the pretzel blank 56 in the vertical direction 14 via the hydraulic jack 7. At the same time, the tying device 8 is moved back to the tying position 51 via the actuator 15 in the direction 24 and by retraction of the hydraulic jack 28, opposite to the displacement distance 53 in the direction 55 (see FIG. 3).

By means of the conveyor belts 3/4/12a/13a the pretzel blank 56 is conveyed to the discharge table 13 for further processing, FIG. 9/9a. At the same time, the dough strand 46 is transferred from the feed unit 1 to the shaping table 2, according to FIGS. 9/9a. For receiving the next or new pretzel strand 46, the tying device 8 with the tying head 9 is moved into the gripping position 48 and the holding pins 5 with the pretzel tool 6 are moved into the uppermost position, see FIG. 9/9a.

In FIG. 3, the movement sequence of the tying head 9 is shown in an overview: during retraction of the dough strand 46 by the conveyor belts 3 and 4 of the shaping table 2, the tying head is in the position 48, so that the gripping fingers 40/41 and 42/43 are disposed in the intermediate region 47. The positions shown in FIG. 3 are respectively relative to the dough strand ends held by the tying device 8. By an overlapping movement of the linear actuator 15 and the further linear axis preferably consisting of the hydraulic jacks 27/28, the tying head 9 is moved into the stretching position 49 in the direction 50. After the stretching step, the tying head 8 is brought to the tying position 51, preferably solely by means of the linear actuator 15 in the direction 23, which is antiparallel to the conveying direction 35. In the tying position 51 and gripping or receiving position 48, the tying head 8 may adopt the same horizontal position, in other words the tying head 8 could be moved from the gripping position into the tying position solely by moving the hydraulic jacks 27 and/or 28. After or even during the tying operation, the tying head 8 is moved in the direction 53 into the depositing position 52, which may be adjusted by means of the control (not shown). It may be provided in particular that the tension built up in the dough strand during the stretching step is maintained at least partially during the tying step, in particular for as long as the tying guide elements are switched on.

The advantages of the present invention, in particular of the embodiment shown, with respect to the prior art may be as follows:

1. Fewer drive and control elements and hence lower manufacturing costs for the apparatus, less programming complexity, simpler use and therefore higher operating reliability.
2. Fewer movable assemblies and consequently a lower maintenance cost and greater operating availability.
3. Higher output, more rapid pay-off of investment and lower costs per unit.
4. Greater versatility, since different pretzel sizes and other products (plaits etc.) may be produced.

LIST OF REFERENCES 1 feed device
2 shaping table
3 narrow conveyor belt
4 wide conveyor belt
5 holding pin
6 pretzel shaping tool
7 hydraulic jack for pretzel tool/holding pins
8 tying device
9 tying head
10 knotting, tying and guide part, left
11 knotting, tying and guide part, right
12 intermediate table
12a conveyor belt from intermediate table
13 discharge table
13a conveyor belt from discharge table
14 vertical downward direction for holding pin
14a vertical upward direction for holding pin 15 linear actuator
16 drive motor for linear actuator
17 toothed belt for linear actuator
18 guide carriage
19 guide carriage
20 vertical guide
21 holding part
22 connecting part between toothed belt and holding part
23 horizontal direction to the left
24 horizontal direction to the right
25 rotary drive
26 rotary duct
27 hydraulic jack
28 hydraulic jack
29 pivotal drive left-hand gripping device
30 pivotal drive right-hand gripping device
31 vertical axis left-hand gripping device
32 vertical axis right-hand gripping device
33 left-hand gripping device
34 right-hand gripping device
35 conveying direction
36 hydraulic jack left-hand knot guide
37 hydraulic jack right-hand knot guide
38 sensor for dough strand end, left
39 sensor for dough strand end, right
40 gripper finger
41 gripper finger
42 gripper finger
43 gripper finger
44 vertical upward direction
45 vertical downward direction
46 pretzel dough strand
46a dough strand end
46b dough strand middle portion
47 intermediate region
48 gripping position
49 stretching position
50 resultant direction in stretching position
51 tying position
52 depositing position
53 resultant direction in depositing position
54 pressing ram
55 resultant direction in basic position
56 pretzel blank
57 vertical axis of rotation
58 yoke
59 base frame
60 pivotal direction/gripping device, left
61 pivotal direction/gripping device, right
d degree of stretch While certain preferred embodiments of the present invention have been disclosed in detail, it is to be understood that various modifications may be adopted without departing from the spirit of the invention or scope of the following claims.

The invention claimed is:

1. Method for the mechanised manufacture of tied dough blanks composed of dough strands, in particular of pretzel blanks, wherein in a first step a dough strand (46) is received by the dough strand ends (46a) by a tying head (9) of a dough-tying device, which is in a gripping position (48), wherein in a second step the dough strand (46) is stretched in its longitudinal direction by a degree of stretch (d), the tying head (9) with the dough strand ends (46a) is moved from the gripping position (48) into a stretching position (49), and the dough strand intermediate section is held between the dough strand ends (46a) by means of a stationary stop (5, 6), wherein in a third step the tying head (9) is moved into a tying position (51) or is rotated, the dough strand (46) being tied, and wherein in a fourth step the tying head (9) is moved into a depositing position (52) in which the dough strand ends are deposited on the rest of the dough strand, characterised in that:
in the second step a control which may be set by programme and/or circuit technology is used with an actuator (15) for the tying head (9), in the case of which control or actuator the degree of stretch (d) may be preset in a variable manner.

2. Method for the mechanised manufacture of tied dough blanks composed of dough strands, in particular of pretzel blanks, wherein in a first step a dough strand (46) is received by the dough strand ends (46a) by a tying head (9) of a dough tying device, which is in a gripping position (48), wherein in a second step the dough strand (46) is stretched in its longitudinal direction by a degree of stretch (d), the tying head (9) with the dough strand ends (46a) is moved from the gripping position (48) into a stretching position (49), and the dough strand intermediate section is held between the dough strand ends (46a) by means of a stationary stop (5, 6), wherein in a third step the tying head (9) is moved into a tying position (51) and/or is rotated, the dough strand (46) being tied, and wherein in a fourth step the tying head (9) is moved into a depositing position (52) in which the dough strand ends are deposited on the rest of the dough strand, characterised in that:
by means of one or more sensors (38, 39) the dough strand ends (46a) of the dough strands (46) are detected in a measuring position located upstream of the gripping position (48) viewed in the conveying direction (35), and thereupon the grasping of the dough strand ends by the tying head (9) is triggered.

3. Method according to claim 2, characterised in that a tension generated during the second or stretching step is maintained in the dough strand (46) during the third or tying step wholly or in part.

4. Method according to claim 3, characterised in that in order to maintain this tension in the third step, knot-tying guide means (10, 11) are used, which form a guide passage.

5. Method according to claim 3, characterised in that in the second or stretching step, the tying head (9) with the dough strand ends (46a) is removed (50) from the stop (5, 6) in or according to a dough strand conveying direction (35).

6. Method according to claim 4, characterised in that in the course of removal (50), a component of motion transverse to the dough strand conveying direction (35) is superimposed on the tying head (9).

7. Method according to claim 4, characterised in that in the third step, in order to reach the tying position (51), the tying head (9) is moved (23) with the dough strand ends (46a) counter to the dough strand conveying direction (35).

8. Method according to claim 4, characterised in that in the fourth step, in order to reach the depositing position (52), the tying head (9) with the dough strand ends (46a) is moved (53) counter to the dough strand conveying direction (35).

9. Method according to claim 8, characterised in that in the course of reaching (53) the depositing position (52) a component of motion transverse to the dough strand conveying direction (35) is superimposed on the tying head (9) in order to approach the dough strand intermediate section between the dough strand ends (46a).

10. A method for the mechanised manufacture of tied dough blanks composed of dough strands, in particular of pretzel blanks, wherein in a first step a dough strand (46) is received by the dough strand ends (46a) by a tying head (9) of a dough-tying device, which is in a gripping position (48), wherein in a second step the dough strand (46) is stretched in its longitudinal direction by a degree of stretch (d), the tying head (9) with the dough strand ends (46*a*) is moved from the gripping position (48) into a stretching position (49), and the dough strand intermediate section is held between the dough strand ends (46*a*) by means of a stationary stop (5, 6), wherein in a third step the tying head (9) is moved into a tying position (51) or is rotated, the dough strand (46) being tied, and wherein in a fourth step the tying head (9) is moved into a depositing position (52) in which the dough strand ends are deposited on the rest of the dough strand, characterised in that:

in the second step the motion of the tying head (9) from the gripping position (48) into a stretching position (49) is obliquely upwardly as a result of simultaneous vertical and horizontal movement away from the stationary stop and in a conveying direction for stretching the dough strand before tying.

11. A method in accordance with claim 10 wherein, in the second step, a control which may be set by programme and/or circuit technology is used with an actuator (15) for the tying head (9), in the case of which control or actuator the degree of stretch (d) may be preset in a variable manner.

12. A method in accordance with claim 10 wherein, by means of one or more sensors (38, 39), the dough strand ends (46*a*) of the dough strands (46) are detected in a measuring position located upstream of the gripping position (48) viewed in the conveying direction (35), and thereupon the grasping of the dough strand ends by the tying head (9) is triggered.

* * * * *